(12) United States Patent
Yin (10) Patent No.: US 9,092,074 B2
(45) Date of Patent: Jul. 28, 2015

(54) MOUSE DEVICE

(71) Applicant: Primax Electronics Ltd., Neihu, Taipei (TW)

(72) Inventor: Tai-Ping Yin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 148 days.

(21) Appl. No.: 13/867,911

(22) Filed: Apr. 22, 2013

(65) Prior Publication Data

US 2014/0210721 A1    Jul. 31, 2014

(30) Foreign Application Priority Data

Jan. 30, 2013    (CN) .................... 2013 2 0052393 U (51) Int. Cl.
*G06F 3/033*    (2013.01)
*G06F 3/0354*    (2013.01)

(52) U.S. Cl.
CPC .................................. *G06F 3/03543* (2013.01)

(58) Field of Classification Search
CPC .............. G09G 5/08; G09G 5/00; G06F 3/02; G06F 3/033

USPC .......................................... 345/157, 163, 166
See application file for complete search history.

(56) References Cited

U.S. PATENT DOCUMENTS

| | | | |
|---|---|---|---|
| 6,369,797 B1 * | 4/2002 | Maynard, Jr. ................. | 345/163 |
| 6,727,889 B2 * | 4/2004 | Shaw ............................ | 345/163 |
| 6,844,871 B1 * | 1/2005 | Hinckley et al. ............. | 345/163 |
| 6,850,223 B2 * | 2/2005 | Hou .............................. | 345/163 |
| 2002/0140676 A1 * | 10/2002 | Kao .............................. | 345/163 |
| 2011/0012833 A1 * | 1/2011 | Chen ............................. | 345/163 |
| 2012/0274564 A1 * | 11/2012 | Cronjaeger et al. .......... | 345/166 |

* cited by examiner

*Primary Examiner* — Pegeman Karimi
(74) *Attorney, Agent, or Firm* — Kirton McConkie; Evan R. Witt (57) ABSTRACT

A mouse device includes an upper cover, a lower cover, a circuit board, a first switch, a second switch, and a triggering element. The circuit board is fixed between the upper cover and the lower cover. The first switch and the second switch are disposed on a bottom surface of the circuit board. The triggering element is pivotally coupled to the lower cover and protruded through a bottom side of the lower cover. When a first side or a second side of the upper cover is depressed, the upper cover, the lower cover and the circuit board are rotated relative to the triggering element. Consequently, the first switch or the second switch is correspondingly triggered.

11 Claims, 6 Drawing Sheets

MOUSE DEVICE

FIELD OF THE INVENTION

The present invention relates to a mouse device, and more particularly to a mouse device without a left button and a right button.

BACKGROUND OF THE INVENTION

A mouse device is a widely-used cursor control device of a computer system. Hereinafter, the structure of a conventional mouse device will be illustrated with reference to FIG. 1.

Figure 1:
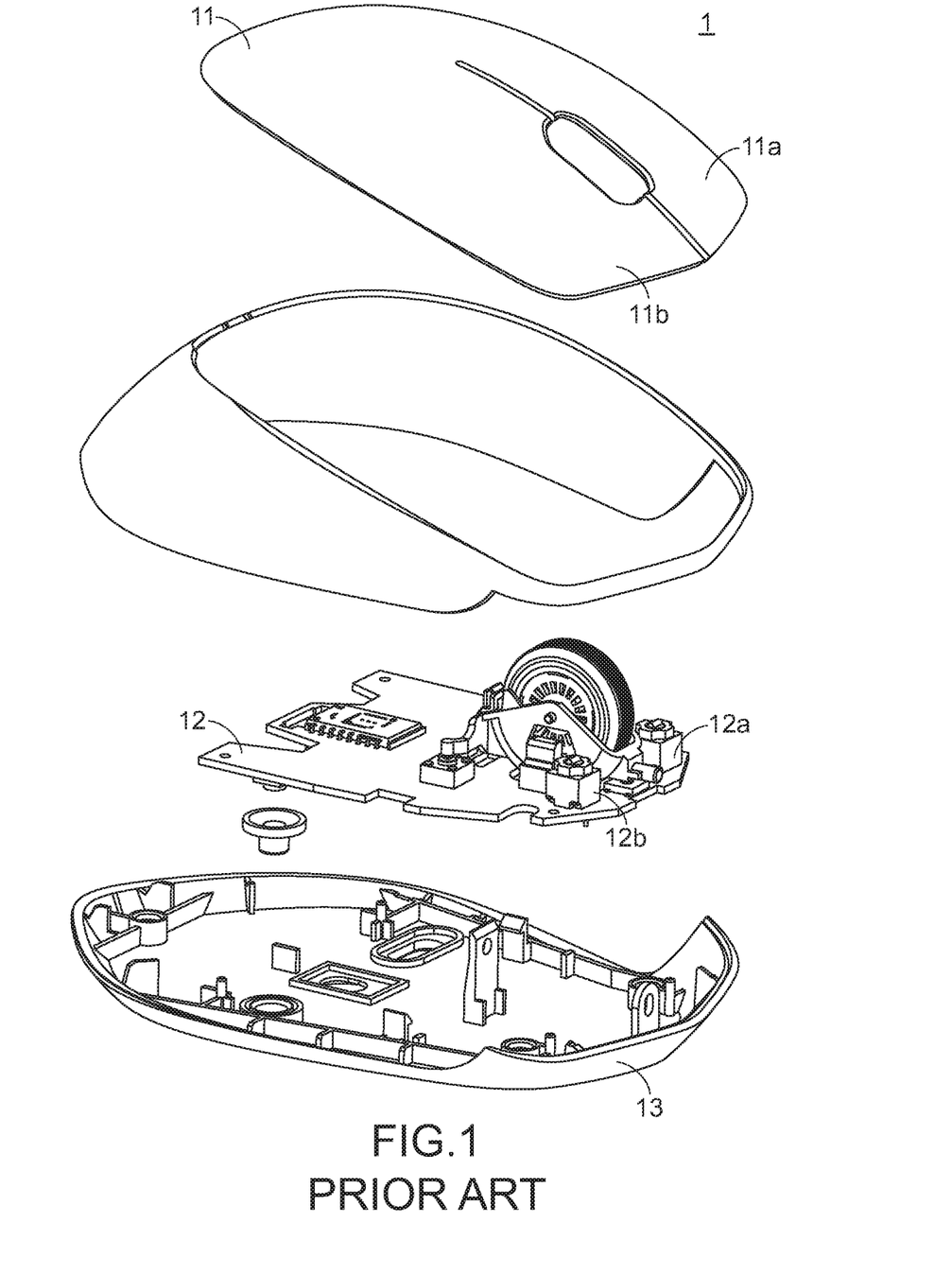
FIG. 1 is a schematic exploded view illustrating a conventional mouse device.

FIG. 1 is a schematic exploded view illustrating a conventional mouse device. First of all, the components of the conventional mouse device 1 will be illustrated. As shown in FIG. 1, the conventional mouse device 1 comprises an upper cover 11, a circuit board 12, and a lower cover 13. The upper cover 11 is divided into a left button zone 11a and a right button zone 11b with respect to a middle portion of the upper cover 11. A first switch 12a and a second switch 12b are disposed on a top surface of the circuit board 12.

For assembling the conventional mouse device 1, the circuit board 12 is firstly placed on the lower cover 13, and then the upper cover 11 is fixedly connected with the lower cover 13 from the top side of the circuit board 12. Meanwhile, the first switch 12a and the second switch 12b are disposed under the left button zone 11a and the right button zone 11b, respectively.

When the left button zone 11a or the right button zone 11b of the upper cover 11 of the mouse device 1 is depressed by the user, the first switch 12a under the left button zone 11a or the second switch 12b under the right button zone 11b is correspondingly pushed by the left button zone 11a or the right button zone 11b. Consequently, the first switch 12a or the second switch 12b is triggered to execute a computer command (e.g. a select command, a cut command, a copy command or a paste command).

From the above discussions, the upper cover 11 of the conventional mouse device 1 is divided into the left button zone 11a and the right button zone 11b, and the first switch 12a or the second switch 12b on the top surface of the circuit board 12 may be triggered by depressing the left button zone 11a or the right button zone 11b.

However, the conventional mouse device 1 still has some drawbacks. For example, since the upper cover 11 of the conventional mouse device 1 is divided into the left button zone 11a and the right button zone 11b, the integrity of the entire outer appearance of the mouse device 1 is destroyed. Moreover, dust or other foreign matters are readily introduced into the conventional mouse device 1 through the space between the left button zone 11a and the right button zone 11b and the upper cover 11. Under this circumstance, the functions of the first switch 12a, the second switch 12b and other electronic components are possibly deteriorated, and the use life of the conventional mouse device 1 is shortened.

Therefore, there is a need of providing an improved mouse device in order to overcome the above drawbacks.

SUMMARY OF THE INVENTION

The present invention provides a mouse device for triggering a first switch or a second switch by rotating a main body of the mouse device.

In accordance with a first aspect of the present invention, there is provided a mouse device. The mouse device includes an upper cover, a lower cover, a circuit board, a first switch, a second switch, and a triggering element. The lower cover is connected with the upper cover, and includes an elongated slot. The circuit board is fixed between the upper cover and the lower cover. The first switch and the second switch are disposed on a bottom surface of the circuit board. The triggering element is disposed within the elongated slot and protruded through a bottom side of the lower cover. Moreover, the triggering element includes a first triggering part and a second triggering part. The first triggering part is located at a first end of the triggering element. The second triggering part is located at a second end of the triggering element. The triggering element is pivotally coupled to the lower cover, so that the lower cover is rotatable relative to the triggering element. When a first side of the upper cover is depressed, the upper cover, the lower cover and the circuit board are rotated in a first direction, and the first triggering part is pushed by the first switch. When a second side of the upper cover is depressed, the upper cover, the lower cover and the circuit board are rotated in a second direction, and the second triggering part is pushed by the second switch.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
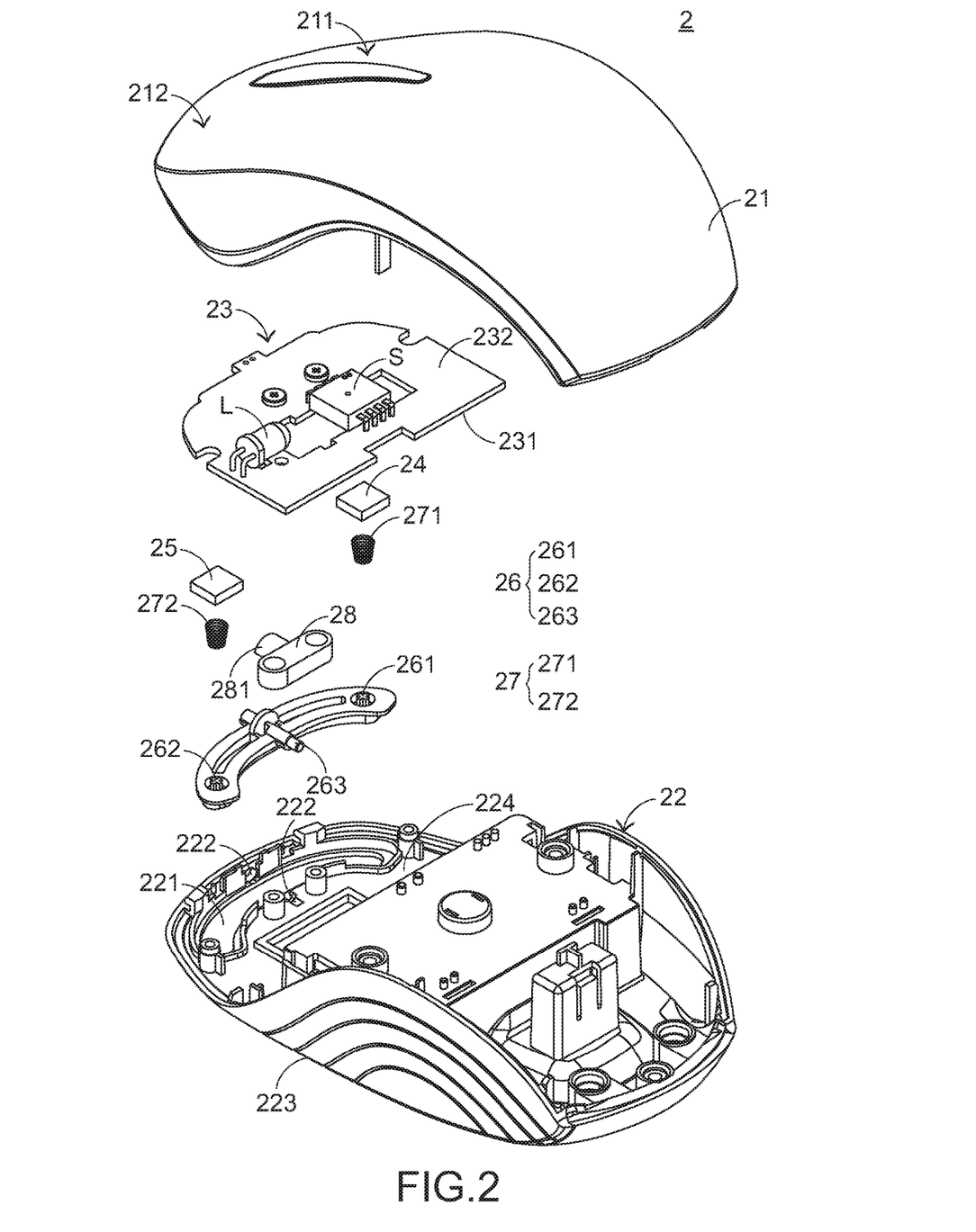
FIG. 2 is a schematic exploded view illustrating a mouse device according to an embodiment of the present invention and taken along a first viewpoint.
Figure 3:
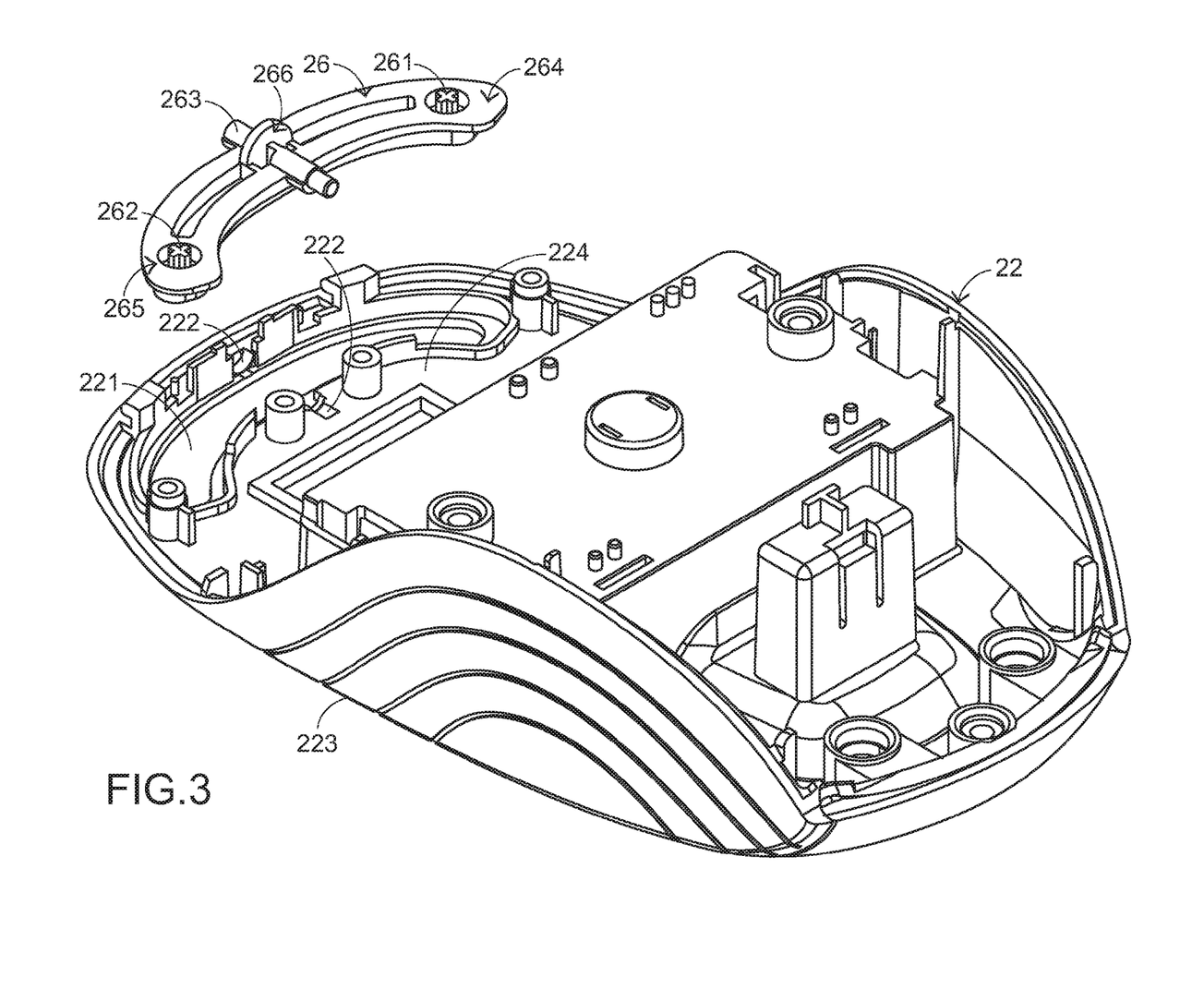
FIG. 3 is a schematic exploded view illustrating the triggering element and the lower cover of the mouse device according to the embodiment of the present invention.

Please refer to FIGS. 2 and 3. The present invention provides a mouse device 2. The components of the mouse device 2 will be illustrated as follows. FIG. 2 is a schematic exploded view illustrating a mouse device according to an embodiment of the present invention and taken along a first viewpoint. FIG. 3 is a schematic exploded view illustrating the triggering element and the lower cover of the mouse device according to the embodiment of the present invention.

The mouse device 2 comprises an upper cover 21, a lower cover 22, a circuit board 23, a first switch 24, a second switch 25, a triggering element 26, an elastic element group 27, and a fixing block 28. The lower cover 22 comprises an elongated slot 221 and two recesses 222. The triggering element 26 comprises a first triggering part 261, a second triggering part 262, and a rotating shaft 263. The elastic element group 27 comprises a first elastic element 271 and a second elastic element 272. The fixing block 28 comprises a protrusion part 281.

The first triggering part 261 is located at a first end 264 of the triggering element 26. The second triggering part 262 is located at a second end 265 of the triggering element 26. The rotating shaft 263 is located at a middle region 266 of the triggering element 26. Moreover, the two recesses 222 are formed in the lower cover 22 and located at bilateral sides of the elongated slot 221, respectively.

Figure 4:
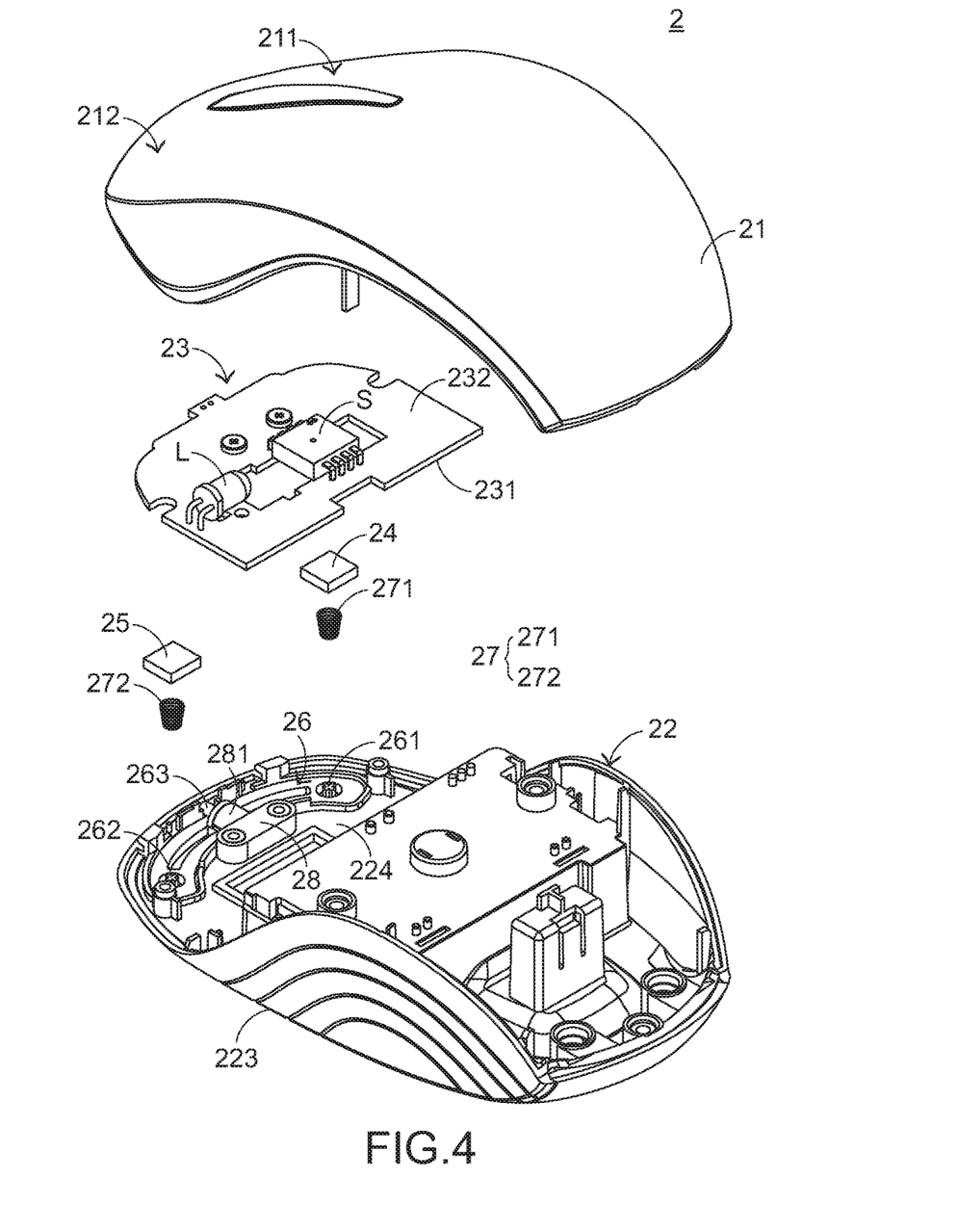
FIG. 4 is a schematic exploded view illustrating the mouse device according to the embodiment of the present invention and taken along a second viewpoint.
Figure 5:
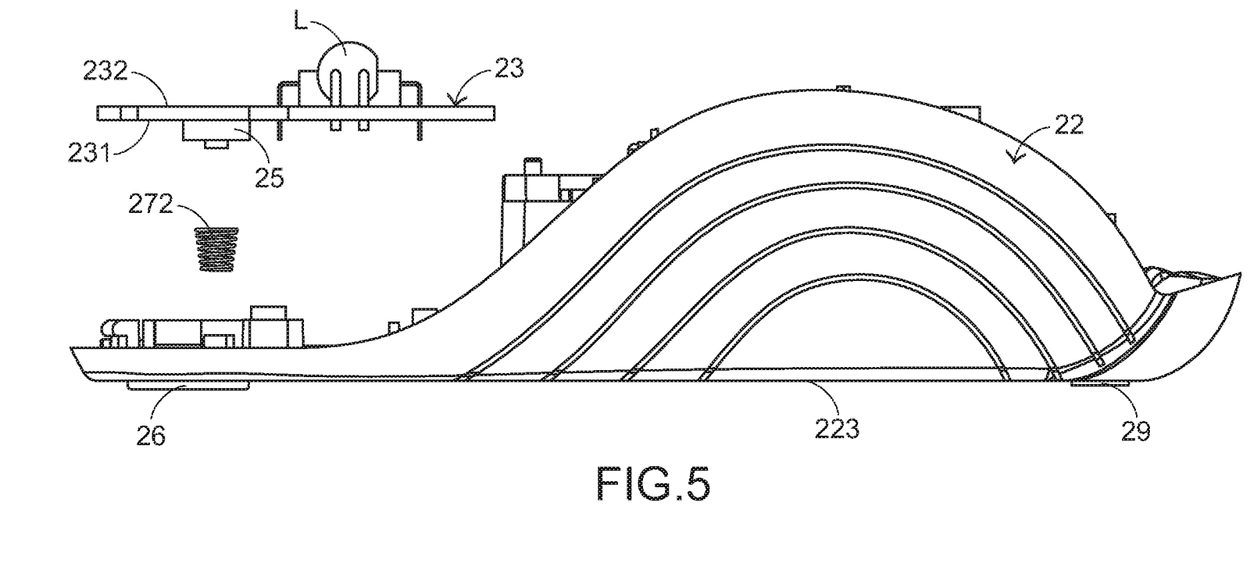
FIG. 5 is a schematic side view illustrating the lower cover, the circuit board, the first switch, the second switch, the triggering element and the elastic element group of the mouse device according to the embodiment of the present invention.

FIG. 4 is a schematic exploded view illustrating the mouse device according to the embodiment of the present invention and taken along a second viewpoint. FIG. 5 is a schematic side view illustrating the lower cover, the circuit board, the first switch, the second switch, the triggering element and the elastic element group of the mouse device according to the embodiment of the present invention. Hereinafter, a sequence of assembling the mouse device 2 will be illustrated with reference to FIGS. 2, 3, 4 and 5.

Firstly, the triggering element 26 is disposed within the elongated slot 221 of the lower cover 22 and protruded through a bottom side 223 of the lower cover 22. Moreover, the two ends of the rotating shaft 263 are disposed within the two recesses 222, respectively. Consequently, the lower cover 22 is rotatable relative to the triggering element 26.

After the mouse device 2 is placed on a working surface (e.g. a desk surface), the portion of the triggering element 26 which is protruded through the bottom side 223 of the lower cover 22 is contacted with the working surface. For maintaining the front side and the rear side of the mouse device 2 at the same altitude, the mouse device 2 further comprises a foot pad 29 in this embodiment. The foot pad 29 is located at another side of the mouse device 2 (see FIG. 5).

The fixing block 28 is fixed on an inner surface 224 of the lower cover 22. Moreover, the middle region 266 of the triggering element 26 is pressed by the protrusion part 281 of the fixing block 28. Consequently, the two ends of the rotating shaft 263 are confined within the two recesses 222 without being detached from the two recesses 222.

The first switch 24 and the second switch 25 are both disposed on a bottom surface 231 of the circuit board 23. The circuit board 23 is fixed on the fixing block 28. Alternatively, in some other embodiments, the circuit board 23 is directly fixed on the lower cover 22 or the upper cover 21. The way of fixing the circuit board 23 is not restricted as long as the circuit board 23 is fixed between the upper cover 21 and the lower cover 22. Moreover, the first elastic element 271 is arranged between the first switch 24 and the first triggering part 261, and the second elastic element 272 is arranged between the second switch 25 and the second triggering part 262.

Afterwards, the upper cover 21 is connected with the lower cover 22. Consequently, the upper cover 21, the lower cover 22 and the circuit board 23 may be simultaneously rotated relative with the triggering element 26.

Figure 6:
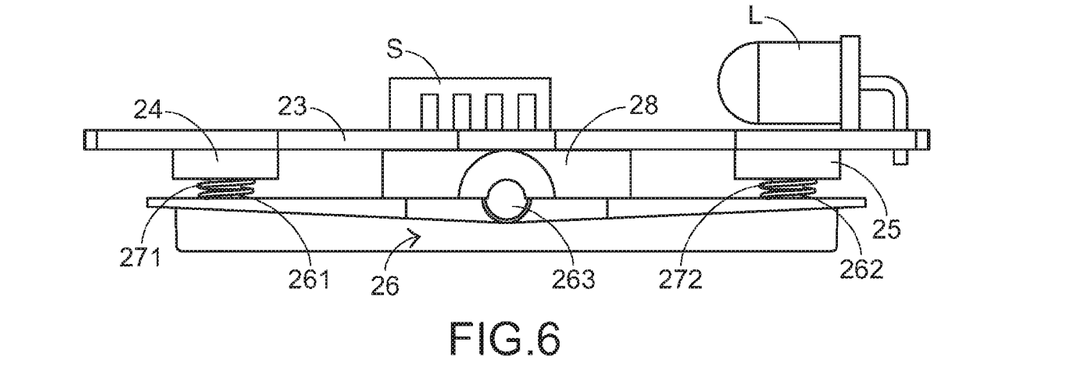
FIG. 6 is a schematic side view illustrating the assembled structure of the circuit board, the first switch, the second switch, the triggering element and the elastic element group of the mouse device according to the embodiment of the present invention.
Figure 7:
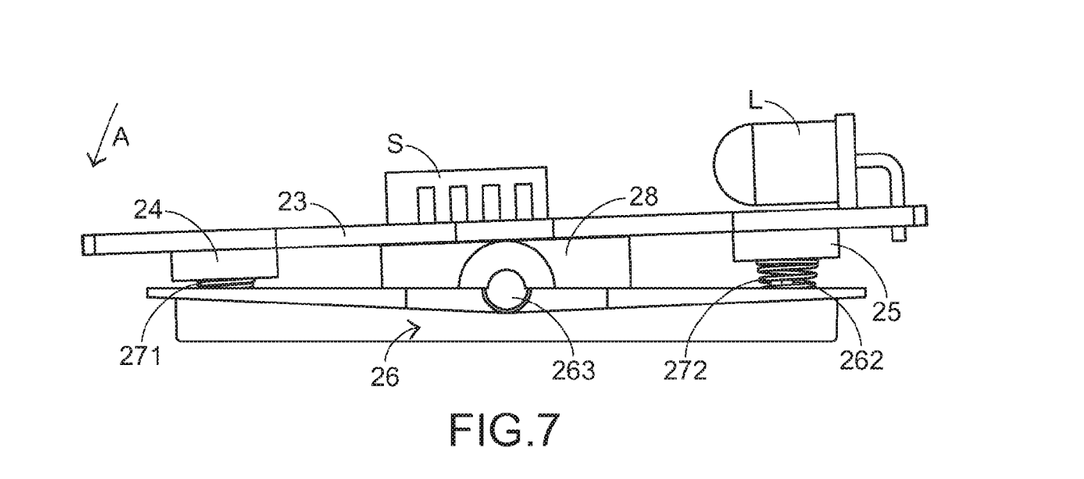
FIG. 7 is a schematic side view illustrating a first action of the mouse device according to the embodiment of the present invention.
Figure 8:
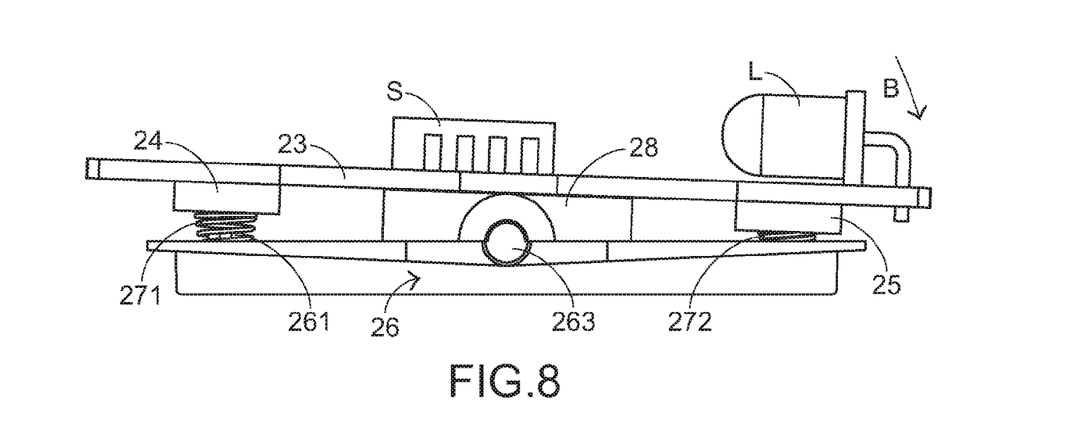
FIG. 8 is a schematic side view illustrating a second action of the mouse device according to the embodiment of the present invention.

FIG. 6 is a schematic side view illustrating the assembled structure of the circuit board, the first switch, the second switch, the triggering element and the elastic element group of the mouse device according to the embodiment of the present invention. FIG. 7 is a schematic side view illustrating a first action of the mouse device according to the embodiment of the present invention. FIG. 8 is a schematic side view illustrating a second action of the mouse device according to the embodiment of the present invention. Hereinafter, the operations of the mouse device 2 will be illustrated with reference to FIG. 2 and FIG. 6-8.

As shown in FIG. 2, the mouse device 2 further comprises a light source L and a displacement sensing device S. The light source L and the displacement sensing device S are disposed on a top surface 232 of the circuit board 23. The displacement sensing device S at least comprises an image capturing unit (not shown) and a processing unit (not shown). After a light beam emitted by the light source L is projected on the working surface where the mouse device 2 is placed (e.g. a desk surface), a reflective light is reflected by the working surface. After the reflective light is received by the image capturing unit, the image capturing unit generates plural images at different time spots. Then, the image at a specified time spot is compared with the image at a next time spot by the processing unit. According to moving degree of the image, a displacement amount of the mouse device 2 is calculated by the processing unit. According to the displacement amount of the mouse device 2, a cursor of a computer system is controlled to be moved in a corresponding direction for a corresponding distance. Consequently, the purpose of controlling the movement of the cursor of the computer system is achieved. The operations and applications of the displacement sensing technology used in the mouse device of the present invention are similar to those used in the conventional optical mouse device, and are not redundantly described herein.

After the cursor is moved to a target position, the first switch 24 or the second switch 25 may be triggered to implement a corresponding function (e.g. the function of opening a menu or opening a program).

Moreover, if a first side 211 or a second side 212 of the upper cover 21 is not depressed (see FIG. 6), the first switch 24 and the second switch 25 are not moved downwardly. Under this circumstance, the first elastic element 271 and the second elastic element 272 are not compressed, and the first switch 24 and the second switch 25 are not triggered.

When the first side 211 of the upper cover 21 is depressed (see FIG. 7), the upper cover 21, the lower cover 22 and the circuit board 23 are all rotated in a first direction A. Under this circumstance, since the first triggering part 261 of the triggering element 26 is pushed by the first switch 24, the first switch 24 is triggered to implement a corresponding function of the computer system (e.g. the function of opening the menu).

Moreover, when the circuit board 23 is rotated in the first direction A, the first elastic element 271 is compressed by the first switch 24 and thus the first elastic element 271 is subjected to deformation. When the first side 211 of the upper cover 21 is no longer depressed by the user, the first elastic element 271 is restored to its original shape. Consequently, the upper cover 21, the lower cover 22 and the circuit board 23 are restored to their original positions as shown in FIG. 6.

Similarly, when the second side 212 of the upper cover 21 is depressed (see FIG. 8), the upper cover 21, the lower cover 22 and the circuit board 23 are all rotated in a second direction B. Under this circumstance, since the second triggering part 262 of the triggering element 26 is pushed by the second switch 25, the second switch 25 is triggered to implement a corresponding function of the computer system (e.g. the function of opening the program).

Moreover, when the circuit board 23 is rotated in the second direction B, the second elastic element 272 is compressed by the second switch 25 and thus the second elastic element 272 is subjected to deformation. When the second side 212 of the upper cover 21 is no longer depressed by the user, the second elastic element 272 is restored to its original shape. Consequently, the upper cover 21, the lower cover 22 and the circuit board 23 are restored to their original positions as shown in FIG. 6.

From the above discussions, since the triggering element 26 is pivotally coupled to the lower cover 22 and the triggering element 26 is protruded through the bottom side 223 of the lower cover 22, the lower cover 22 is rotatable relative to the triggering element 26.

In other words, when the first side 211 or the second side 212 of the upper cover 21 is depressed, the triggering element 26 is pushed by the first switch 24 or the second switch 25, so that the first switch 24 or the second switch 25 is correspondingly triggered.

From the above discussions, the present invention provides a mouse device. Since the upper cover is not divided into a left button zone and a right button zone, the problems of destroying the integrity of the entire outer appearance of the conventional mouse device and introducing foreign matters into the conventional mouse device will be overcome. Moreover, when compared with the conventional mouse device, the integrity of the entire outer appearance of the mouse device of the present invention is enhanced, and the use life of the mouse device of the present invention is prolonged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
    an upper cover;
    a lower cover connected with said upper cover, and comprising an elongated slot;
    a circuit board fixed between said upper cover and said lower cover;
    a first switch and a second switch disposed on a bottom surface of said circuit board; and
    a triggering element disposed within said elongated slot and protruded through a bottom side of said lower cover, and comprising a first triggering part and a second triggering part, wherein said first triggering part is located at a first end of said triggering element, said second triggering part is located at a second end of said triggering element, and said triggering element is pivotally coupled to said lower cover, so that said lower cover is rotatable relative to said triggering element,
    wherein when a first side of said upper cover is depressed, said upper cover, said lower cover and said circuit board are rotated in a first direction, and said first triggering part is pushed by said first switch, wherein when a second side of said upper cover is depressed, said upper cover, said lower cover and said circuit board are rotated in a second direction, and said second triggering part is pushed by said second switch,
    wherein said lower cover further comprises a recess, and said triggering element further comprises a rotating shaft, wherein said rotating shaft is located at a middle region of said triggering element and disposed within said recess, so that said lower cover is rotatable relative to said triggering element.

2. The mouse device according to claim 1, wherein said mouse device further comprises an elastic element group, wherein said elastic element group is arranged between said circuit board and said triggering element for restoring said upper cover, said lower cover and said circuit board to original positions thereof.

3. The mouse device according to claim 1, further comprising a fixing block, wherein said fixing block is disposed on an inner surface of said lower cover.

4. The mouse device according to claim 3, wherein said circuit board is fixed on said fixing block.

5. The mouse device according to claim 3, wherein said fixing block comprises a protrusion part for pressing a middle region of said triggering element.

6. The mouse device according to claim 1, further comprising:
    a light source for emitting a light beam, wherein when said light beam is projected on a working surface, a reflective light is reflected from said working surface; and
    a displacement sensing device for receiving said reflective light and calculating a displacement amount of said mouse device.

7. A mouse device, comprising:
    an upper cover;
    a lower cover connected with said upper cover, and comprising an elongated slot;
    a circuit board fixed between said upper cover and said lower cover;
    a first switch and a second switch disposed on a bottom surface of said circuit board;
    a triggering element disposed within said elongated slot and protruded through a bottom side of said lower cover, and comprising a first triggering part and a second triggering part, wherein said first triggering part is located at a first end of said triggering element, said second triggering part is located at a second end of said triggering element, and said triggering element is pivotally coupled to said lower cover, so that said lower cover is rotatable relative to said triggering element; and
    an elastic element group, wherein said elastic element group is arranged between said circuit board and said triggering element for restoring said upper cover, said lower cover and said circuit board to original positions thereof,
    wherein when a first side of said upper cover is depressed, said upper cover, said lower cover and said circuit board are rotated in a first direction, and said first triggering part is pushed by said first switch, wherein when a second side of said upper cover is depressed, said upper cover, said lower cover and said circuit board are rotated in a second direction, and said second triggering part is pushed by said second switch.

8. The mouse device according to claim 7, further comprising a fixing block, wherein said fixing block is disposed on an inner surface of said lower cover.

9. The mouse device according to claim 8, wherein said circuit board is fixed on said fixing block.

10. The mouse device according to claim 8, wherein said fixing block comprises a protrusion part for pressing a middle region of said triggering element.

11. The mouse device according to claim 7, further comprising:
    a light source for emitting a light beam, wherein when said light beam is projected on a working surface, a reflective light is reflected from said working surface; and a displacement sensing device for receiving said reflective light and calculating a displacement amount of said mouse device.

* * * * *